US012461607B2

(12) United States Patent
Lei et al.

(10) Patent No.: US 12,461,607 B2
(45) Date of Patent: Nov. 4, 2025

(54) FOLDABLE INPUT DEVICE

(71) Applicant: Microsoft Technology Licensing, LLC, Redmond, WA (US)

(72) Inventors: Pengfei Lei, Shenzhen (CN); Stephen chi hung Chiu, Kaohsiung (TW); Kelong Zhao, Shenzhen (CN); Haiji Sun, Shenzhen (CN); Simon Cameron Dearsley, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/577,459

(22) PCT Filed: Aug. 3, 2022

(86) PCT No.: PCT/US2022/074481
§ 371 (c)(1),
(2) Date: Jan. 8, 2024

(87) PCT Pub. No.: WO2023/023449
PCT Pub. Date: Feb. 23, 2023

(65) Prior Publication Data
US 2024/0176430 A1    May 30, 2024

(30) Foreign Application Priority Data
Aug. 17, 2021    (NL) .................................... 2028980

(51) Int. Cl.
*G06F 3/02*        (2006.01)
*G06F 3/0354*    (2013.01)

(52) U.S. Cl.
CPC ........ *G06F 3/03543* (2013.01); *G06F 3/0202* (2013.01); *G06F 2203/0332* (2013.01)

(58) Field of Classification Search
None
See application file for complete search history.

(56) References Cited

U.S. PATENT DOCUMENTS

| 7,724,238 B2 | 5/2010 | Daniel |
| 8,345,006 B2 | 1/2013 | Snyder |

(Continued)

FOREIGN PATENT DOCUMENTS

| CN | 201387594 Y | 1/2010 |
| JP | 2013089219 A | 5/2013 |
| KR | 20210095778 A | 8/2021 |

OTHER PUBLICATIONS

"Wireless Mouse with USB Mini Folding Mouse 2.4GHz Arc Optical Touch Receiver Suitable for PC Laptop MacBook", accessed on link https://www.ubuy.co.id/en/product/TOOXBPW-surface-mouse-arc-mouse-2-4ghz-arc-touch-wireless-touch-optical-mouse-with-usb-receiver-for-notebook, retrieved on Jun. 13, 2021, 5 pages.

(Continued)

*Primary Examiner* — Parul H Gupta
(74) *Attorney, Agent, or Firm* — Alleman Hall & Tuttle LLP

(57) ABSTRACT

Examples are disclosed that relate to an input device foldable between a flat orientation in which both ends of a module comprising a sensor are within the input device and a curved orientation in which one end of the module protrudes. A head portion comprises a recess containing the module. A foldable tail portion is coupled to the head portion. A slidable frame comprises an anchor portion affixed to the foldable tail portion and a connecting portion configured to slide relative to the tail portion. A linkage is affixed to the slidable frame and configured to engage and move the module relative to the head portion upon sliding of the slidable frame.

20 Claims, 9 Drawing Sheets

(56) References Cited

U.S. PATENT DOCUMENTS

| | | |
|---|---|---|
| 8,693,179 B2 | 4/2014 | Wei |
| 10,394,282 B2 * | 8/2019 | Lee ........................ G06F 1/1677 |
| 10,394,347 B2 | 8/2019 | Streltsov |
| 2004/0075588 A1 * | 4/2004 | Wang ..................... G06F 1/1632 |
| | | 361/679.08 |
| 2006/0022943 A1 | 2/2006 | Johnson et al. |
| 2010/0014905 A1 * | 1/2010 | Morris ................. G06F 3/04895 |
| | | 400/489 |
| 2016/0105542 A1 * | 4/2016 | Lee ................... H04M 1/72403 |
| | | 455/566 |
| 2018/0341345 A1 * | 11/2018 | Streltsov ............. G06F 3/03543 |
| 2020/0233465 A1 * | 7/2020 | Lim ...................... G06F 1/1669 |
| 2020/0326754 A1 * | 10/2020 | Kim ........................ G09F 9/301 |
| 2020/0379582 A1 * | 12/2020 | Zeng .................... G06F 3/03543 |
| 2022/0342456 A1 * | 10/2022 | Shen .................... H05K 5/0221 |

OTHER PUBLICATIONS

International Search Report and Written Opinion received for PCT Application No. PCT/US2022/074481, Oct. 21, 2022, 13 pages.
Search Report and Written Opinion Issued in Netherlands Patent Application No. N2028980, May 18, 2022, 11 Pages.

* cited by examiner

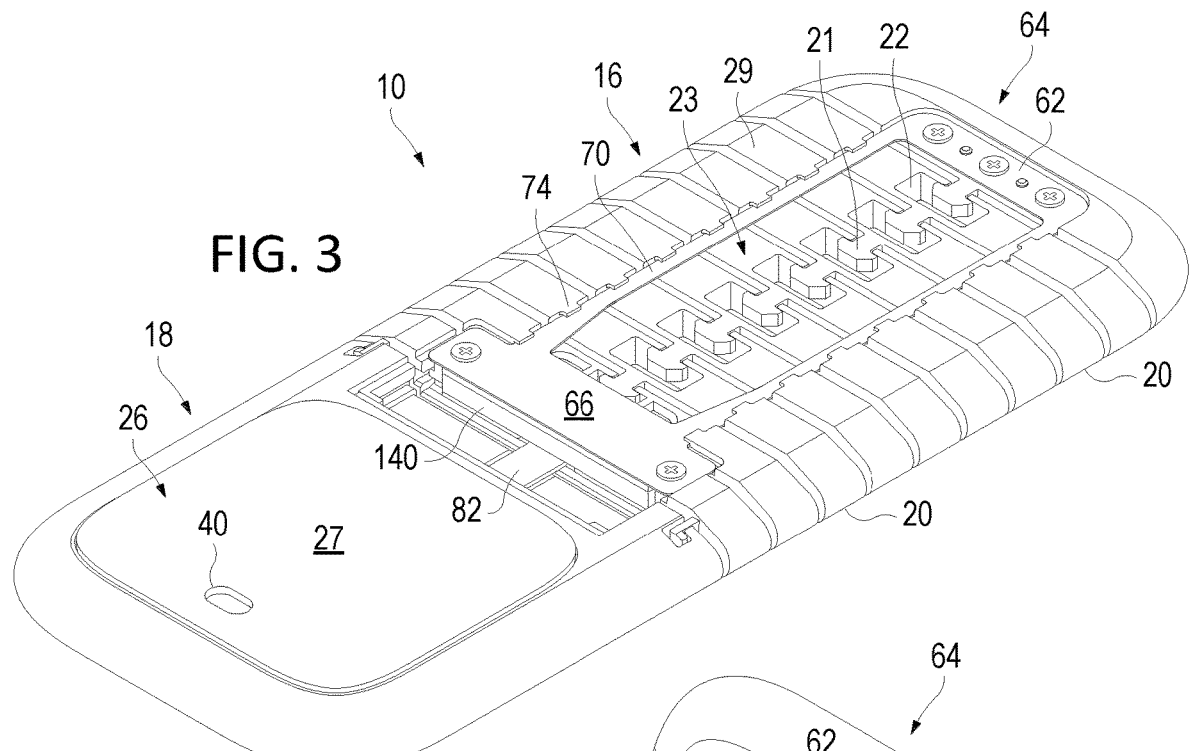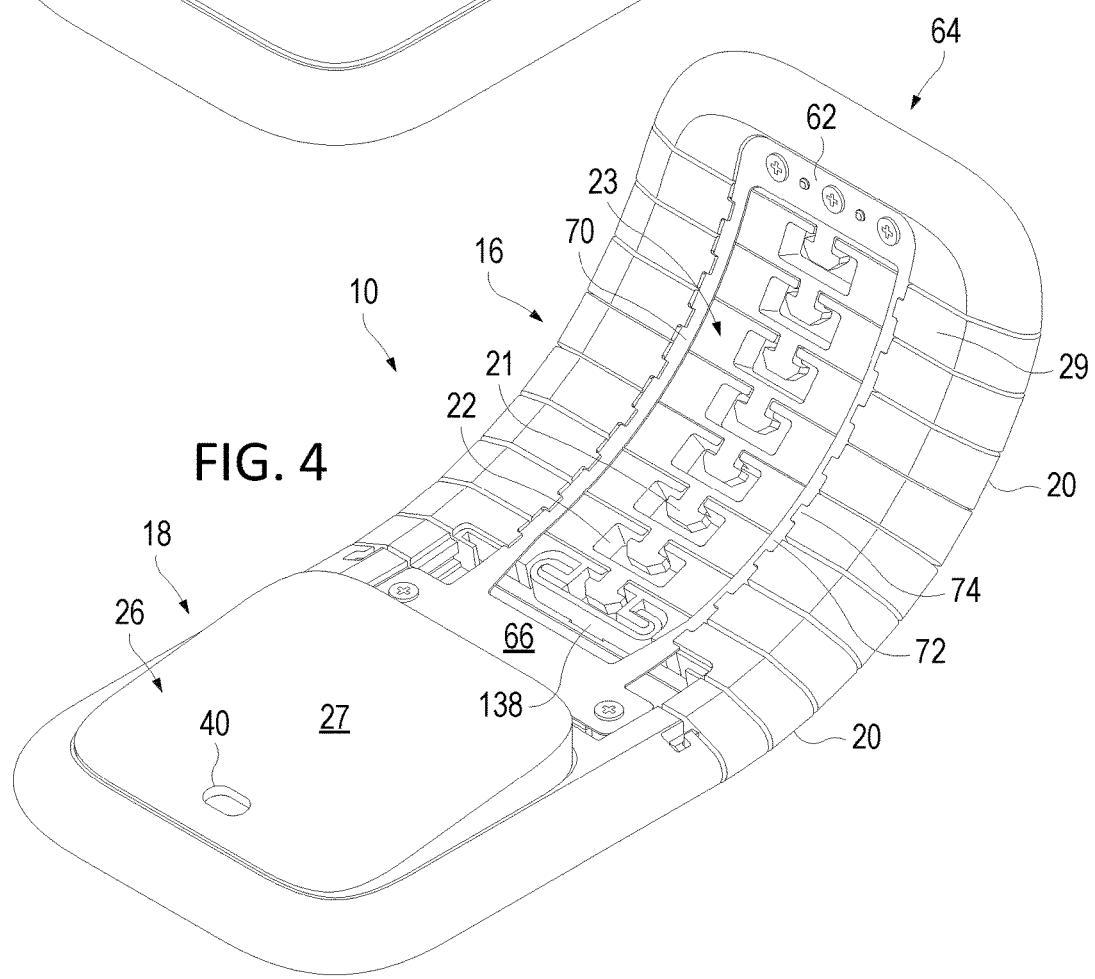

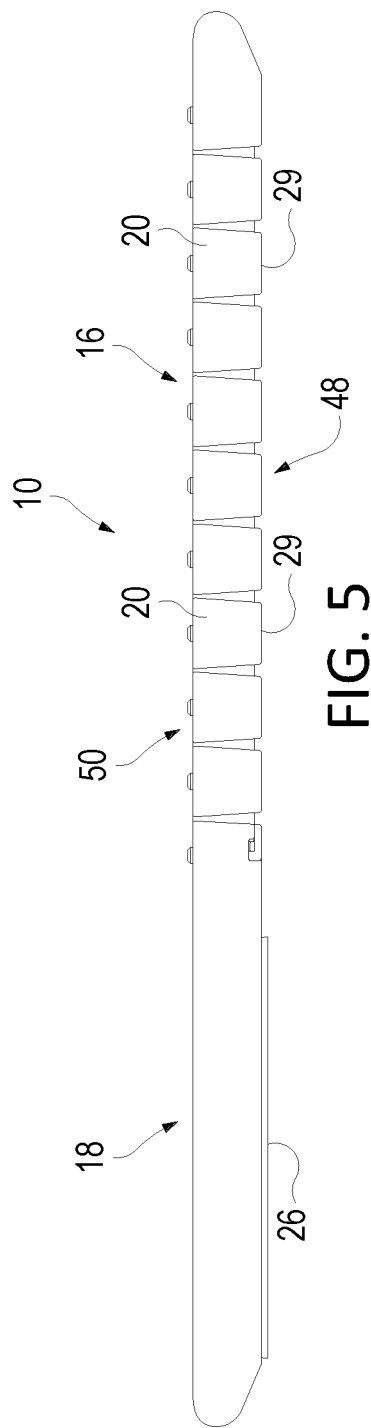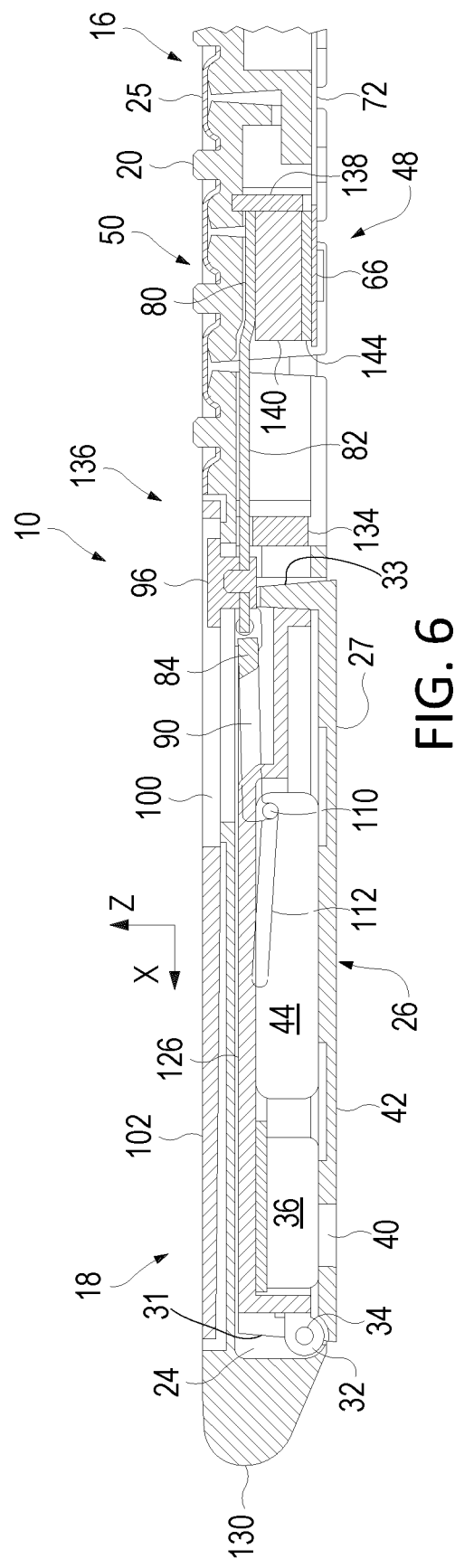

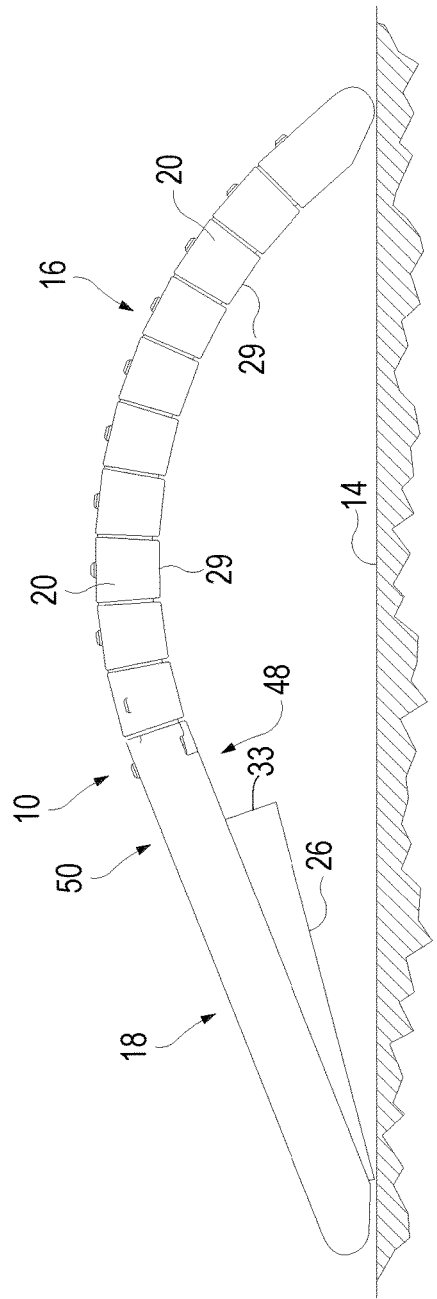
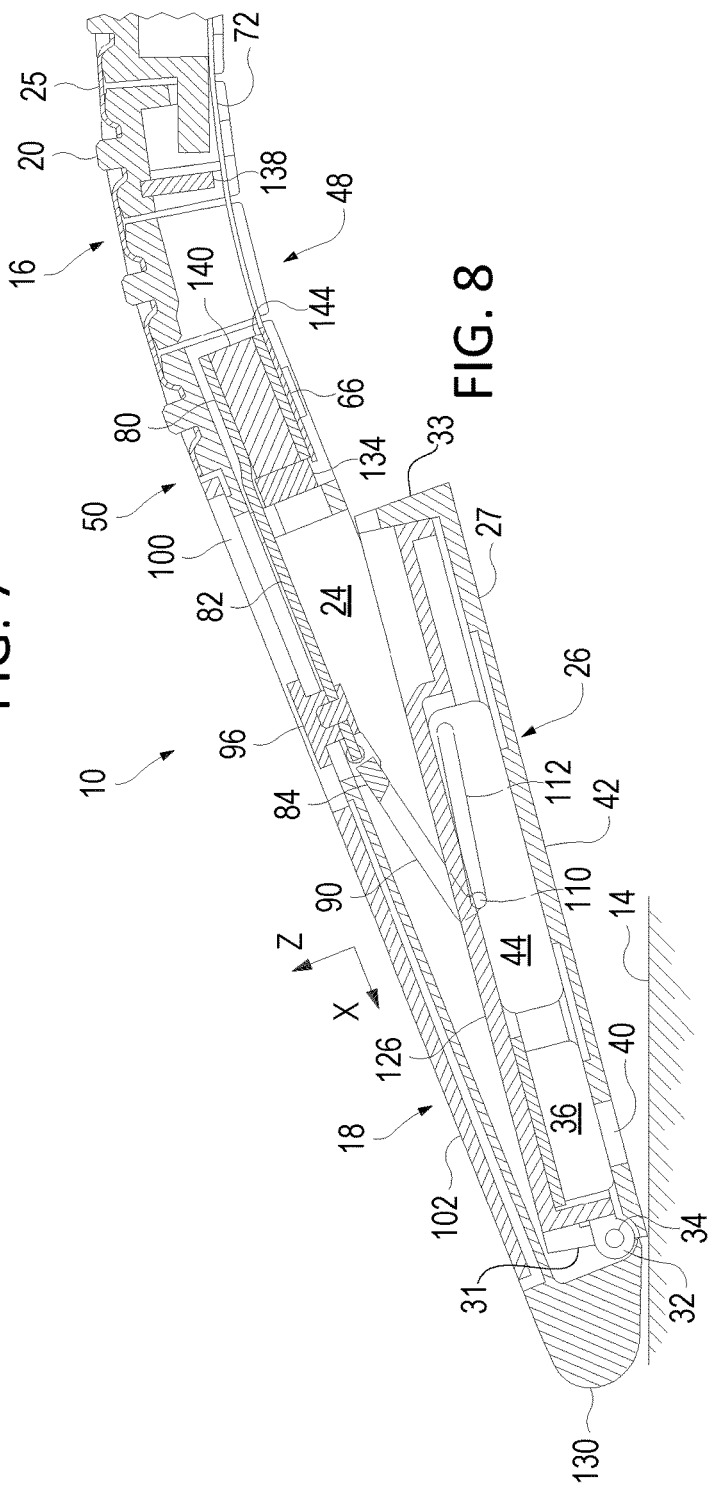

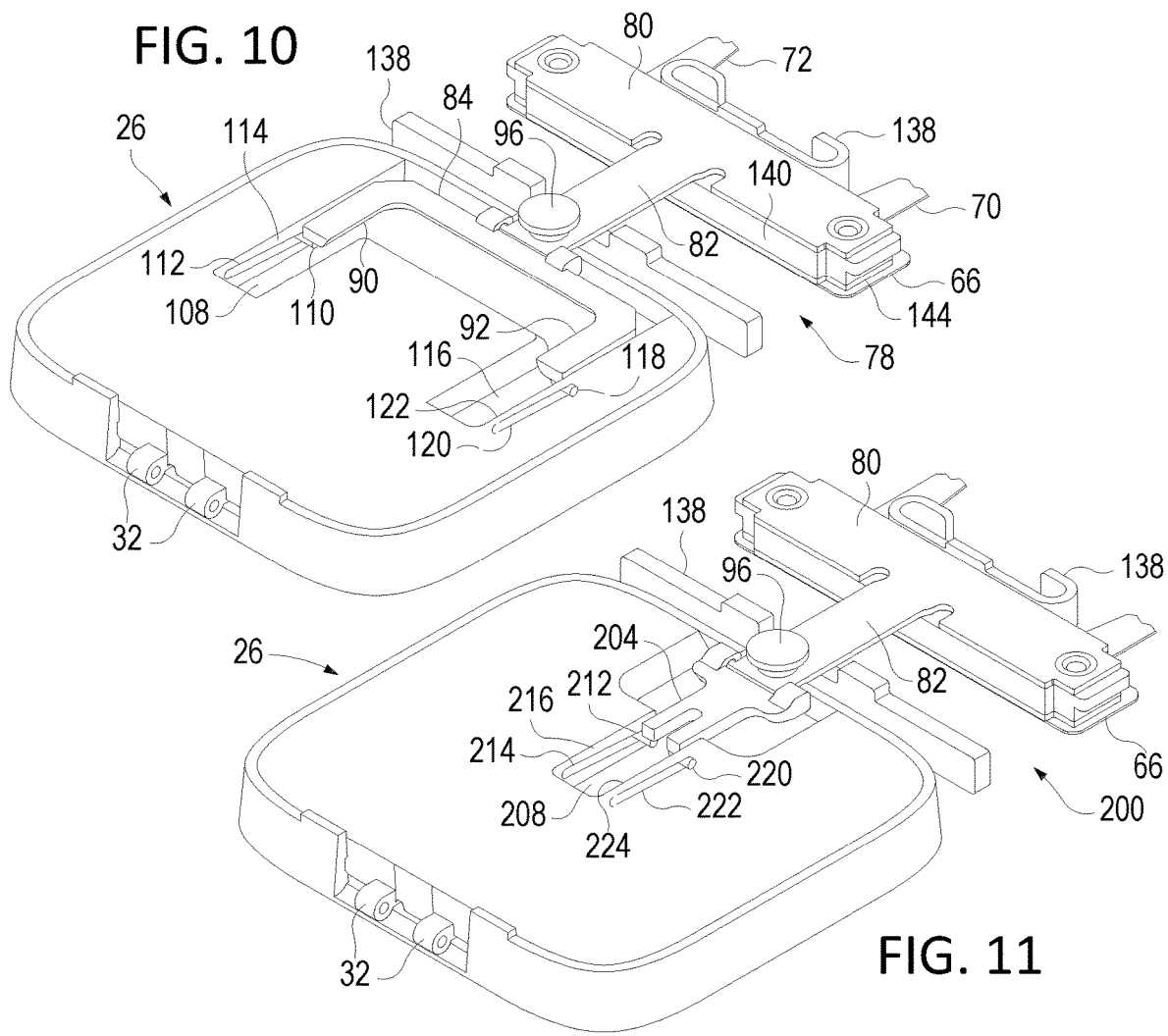
FIG. 10
FIG. 11
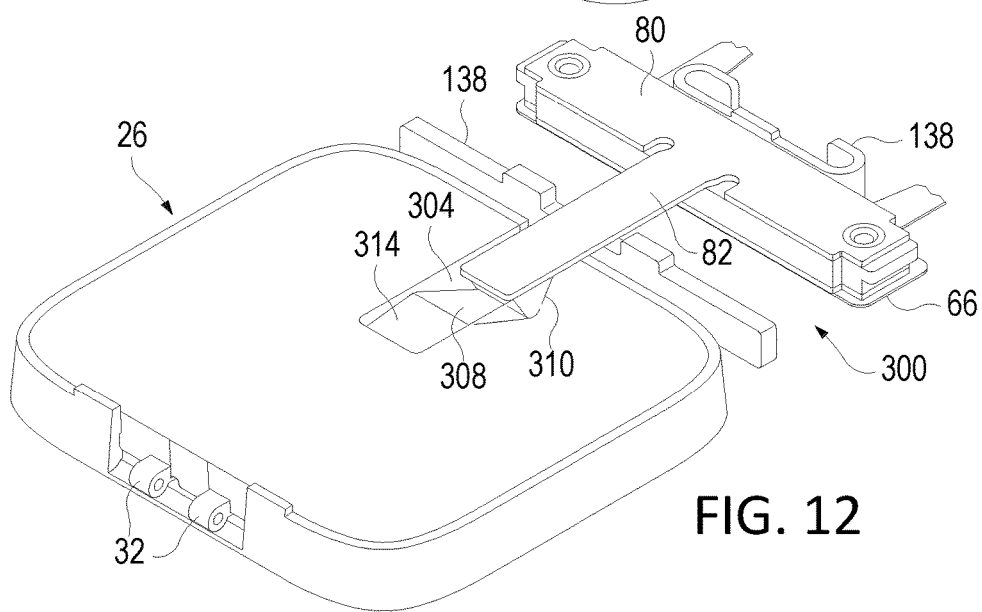
FIG. 12

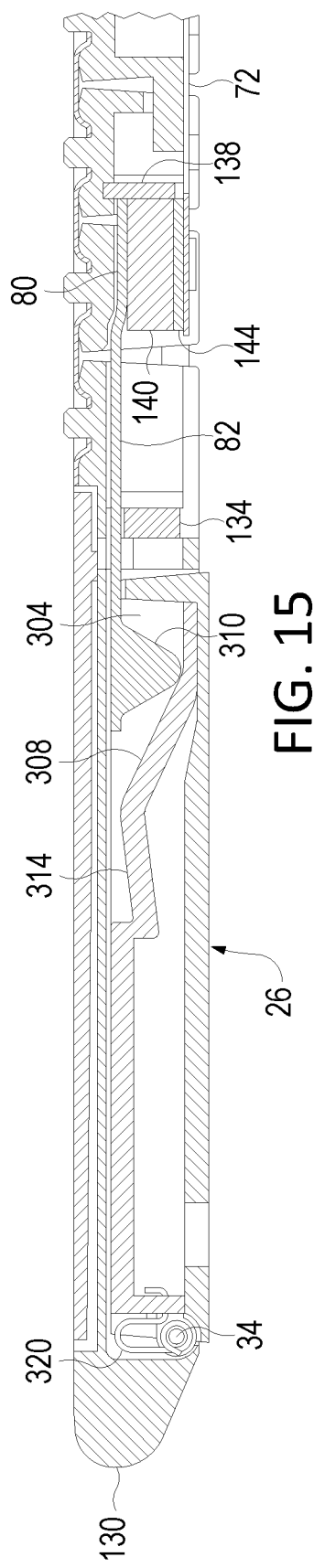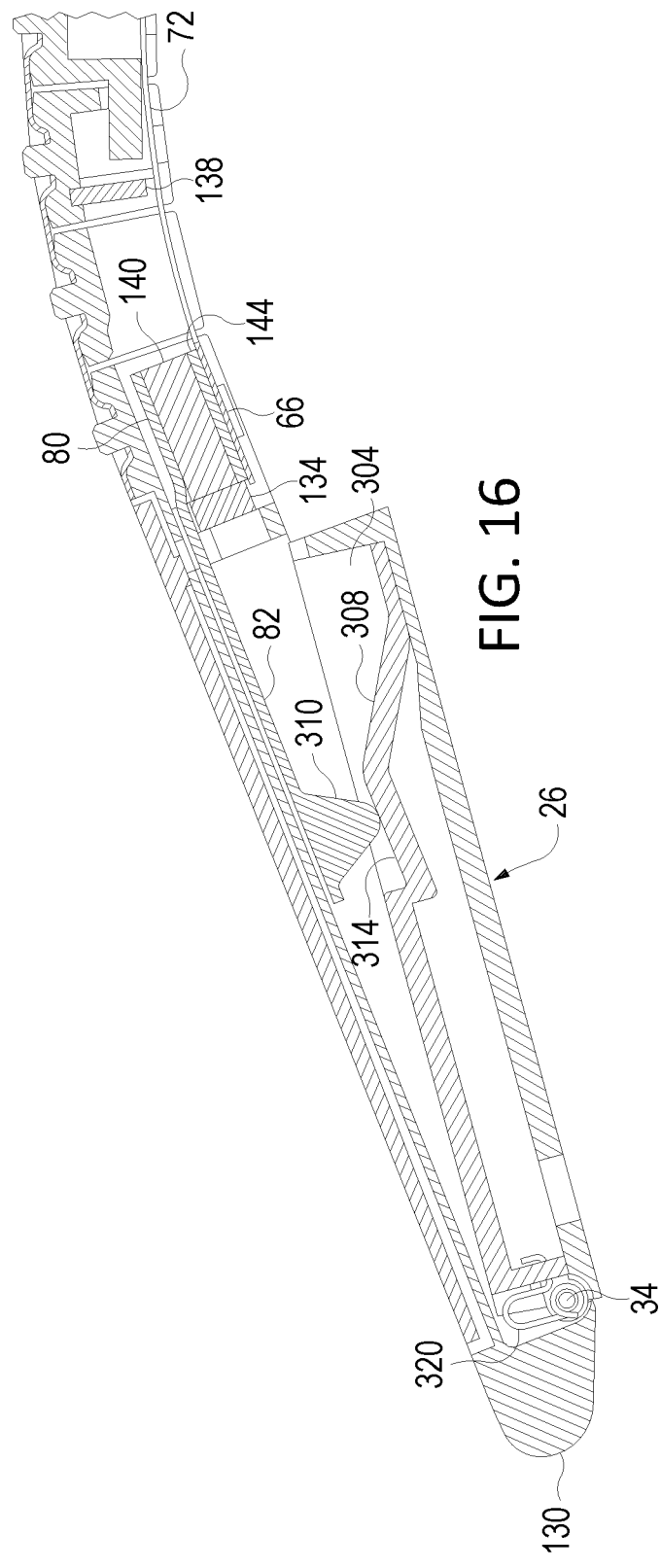

← 400

BEND THE FOLDABLE TAIL PORTION FROM THE FLAT ORIENTATION TO THE CURVED ORIENTATION, THEREBY CAUSING THE LINKAGE TO MOVE TOWARD THE HEAD PORTION, THEREBY CAUSING THE MODULE TO MOVE FROM A RECESSED POSITION WITHIN THE RECESS TO A PROTRUDING POSITION BEYOND THE RECESS 404

FIG. 17

FOLDABLE INPUT DEVICE

CROSS REFERENCE TO RELATED APPLICATIONS

The present application is a U.S. National Phase of International Patent Application Serial No. PCT/US2022/074481 entitled "FOLDABLE INPUT DEVICE", filed Aug. 3, 2022, which claims priority to Netherlands Patent Application Serial No. 2028980, filed Aug. 17, 2021, the entire contents of each of which are hereby incorporated by reference for all purposes.

BACKGROUND

Some input devices, such as a mouse device, may be folded from a generally flat configuration into a curved configuration. These devices can utilize articulated segments coupled to one another to allow the device to be folded.

SUMMARY

Examples are disclosed that relate to foldable input devices. One example provides an input device foldable between a flat orientation in which both ends of a module comprising a sensor are within the input device and a curved orientation in which the module protrudes. A head portion comprises a recess containing the module. A foldable tail portion is coupled to the head portion. A slidable frame comprises an anchor portion affixed to a rear end of the foldable tail portion, and an opposite connecting portion configured to slide relative to the tail portion. A linkage comprises a slidable frame connector affixed to the connecting portion and is configured to engage and move the module relative to the head portion upon movement of the slidable frame relative to the tail.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows a bottom perspective view of the foldable input device of FIG. 1 in the flat orientation according to examples of the present disclosure.

FIG. 4 shows the foldable input device of FIG. 3 in the curved orientation according to examples of the present disclosure.

FIG. 5 shows a side view of the foldable input device of FIG. 1 in the flat orientation according to examples of the present disclosure.

FIG. 6 shows a sectional view of the foldable input device of FIG. 5 taken along line 6-6 in FIG. 1 according to examples of the present disclosure.

FIG. 7 shows a side view of the foldable input device of FIG. 2 in the curved orientation according to examples of the present disclosure.

FIG. 8 shows a sectional view of the foldable input device of FIG. 7 according to examples of the present disclosure.

FIG. 10 shows a partial view of a linkage and a module of the foldable input device of FIG. 1 according to examples of the present disclosure.

FIG. 11 shows a partial view of another example linkage and module of a foldable input device according to examples of the present disclosure.

FIG. 12 shows a partial view of another example linkage and module of a foldable input device according to examples of the present disclosure.

FIG. 15 shows a sectional view of another example foldable input device in a flat orientation according to examples of the present disclosure.

FIG. 16 shows a sectional view of the foldable input device of FIG. 15 in a curved orientation according to examples of the present disclosure.

FIG. 17 shows a flowchart illustrating a method of folding an input device between a flat orientation and a curved orientation.

DETAILED DESCRIPTION

As noted above, some input devices may be folded between a generally flat configuration and a curved configuration. For example, some wireless mouse devices may be folded between flat and curved configurations. Many of these devices, however, utilize a permanently protruding section that houses components and/or other features, thereby compromising portability and device aesthetics.

As described in more detail below, examples of the present disclosure provide an input device that is foldable between a flat orientation, in which a both ends of a module comprising a sensor are within the input device, and a curved orientation in which one of the ends of the module protrudes from the input device. Advantageously, the input devices include linkage mechanisms coupled to a folding portion and configured to move the module between a recessed position when the device is in a flat orientation to a protruding position when the device is in a curved orientation.

In this manner, when the device is in the flat orientation, the device presents a uniform and flat configuration in which both ends of the module are within the input device, and the module is substantially flush with the outer surface of the device, thereby enhancing portability and presenting a flat device with uniform height. When the device is folded to the curved orientation, and as described in more detail below, the linkage mechanisms cause the one end of the module to protrude from the device to provide an improved angle of incidence for an optical beam emitted from the module with respect to an underlying surface.

With reference now to FIGS. 1-10, one example of an input device 10 of the present disclosure is presented. For ease of description, these figures show the input device 10 without an exterior skin or other covering. In different examples, a variety of coverings may be utilized for all or portions of the input device, including various fabrics and other materials.

Figure 1:
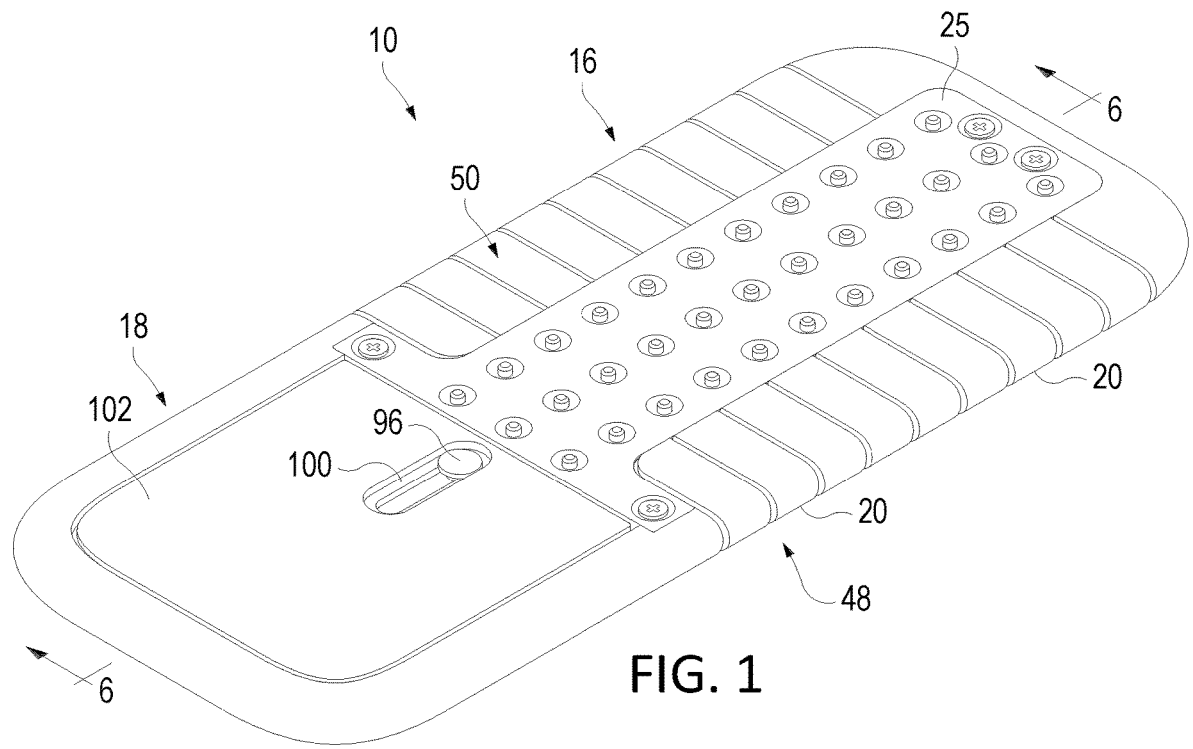
FIG. 1 shows a top perspective view of foldable input device in a flat orientation according to examples of the present disclosure.
Figure 2:
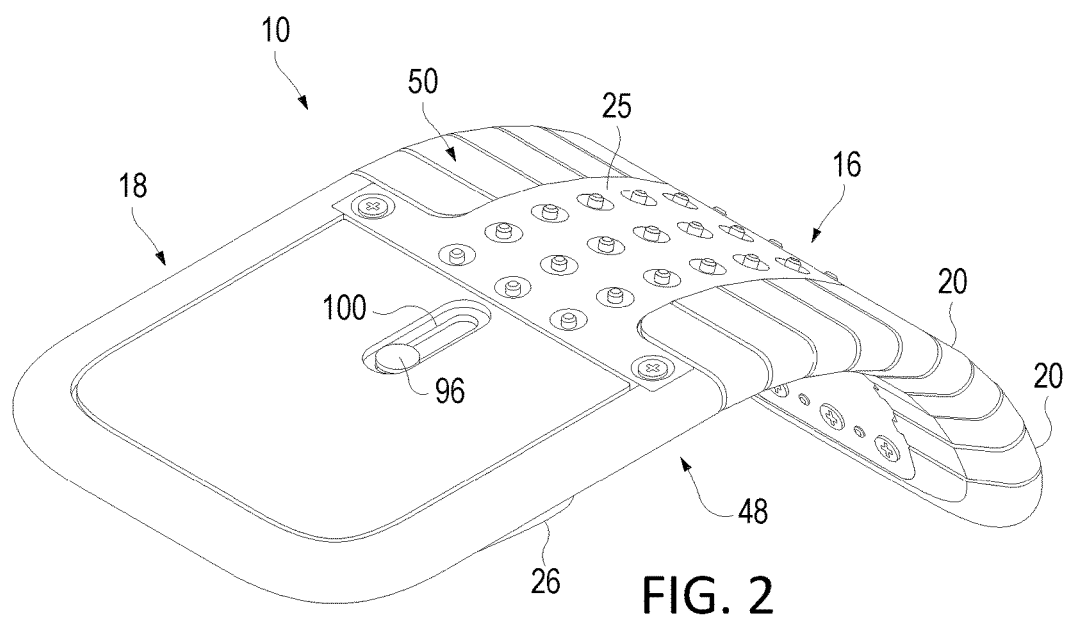
FIG. 2 shows the foldable input device of FIG. 1 in a curved orientation according to examples of the present disclosure.

As shown in FIGS. 1-4, 5, and 7, the input device 10 is foldable between a flat orientation shown in FIGS. 1, 3, and 5 and a curved orientation shown in FIGS. 2, 4, and 7. FIGS. 1 and 2 show a top view of the input device 10 that illustrates the surfaces against which a user's hand would rest when using the device as a mouse. With reference also to FIG. 7, in the curved orientation the input device 10 forms a gently sloping configuration on which a user's hand may comfortably rest to operate and move the device relative to an underlying surface 14.

With reference to FIGS. 1-9, the input device 10 includes a foldable tail portion 16 that is coupled to a head portion 18. As best seen in FIGS. 3 and 4, the foldable tail portion 16 utilizes a plurality of tail segments 20 that are moveably coupled to one another via interlocking fingers 21 and corresponding cavities 22 in a middle segment 23 to facilitate the folding action of the tail portion. As shown in FIGS. 1 and 2, the top side 50 of the input device 10 includes a flexible support frame 25 overlaying the tail segments 20 that provides structural support to the foldable tail portion 16.

Figure 9:
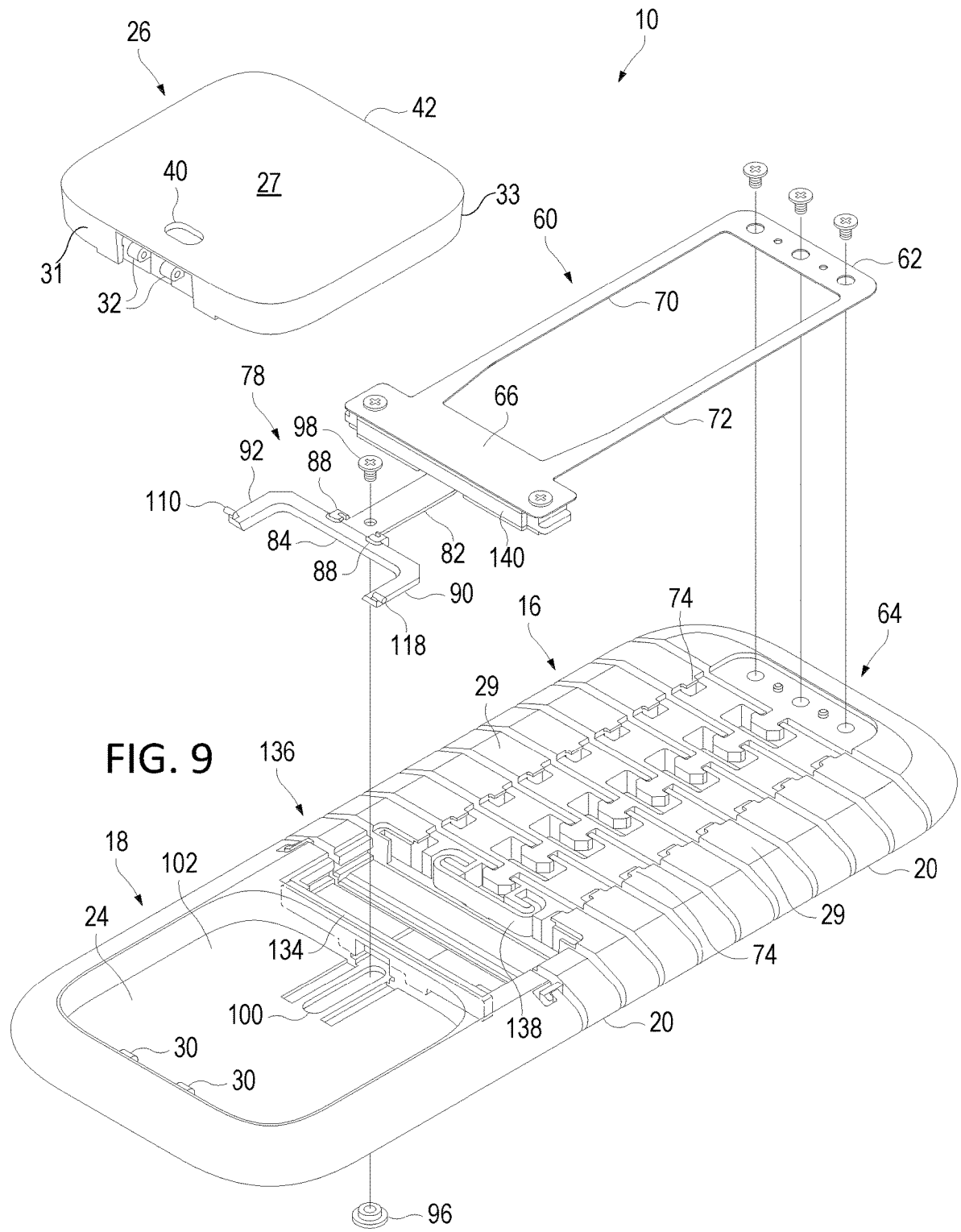
FIG. 9 shows a bottom exploded view of the foldable input device of FIG. 3 according to examples of the present disclosure.

As best seen in FIGS. 8 and 9, the head portion 18 comprises a recess 24 in which a module 26 is positioned. As described in more detail below, the module 26 includes one or more sensors configured to provide position tracking information for tracking movement of the input device 10. The module 26 includes a pivoting end 31 that is rotatably coupled to the head portion 18 via a hinge comprising head portion barrels 30, module barrels 32, and pin 34.

Figure 13:
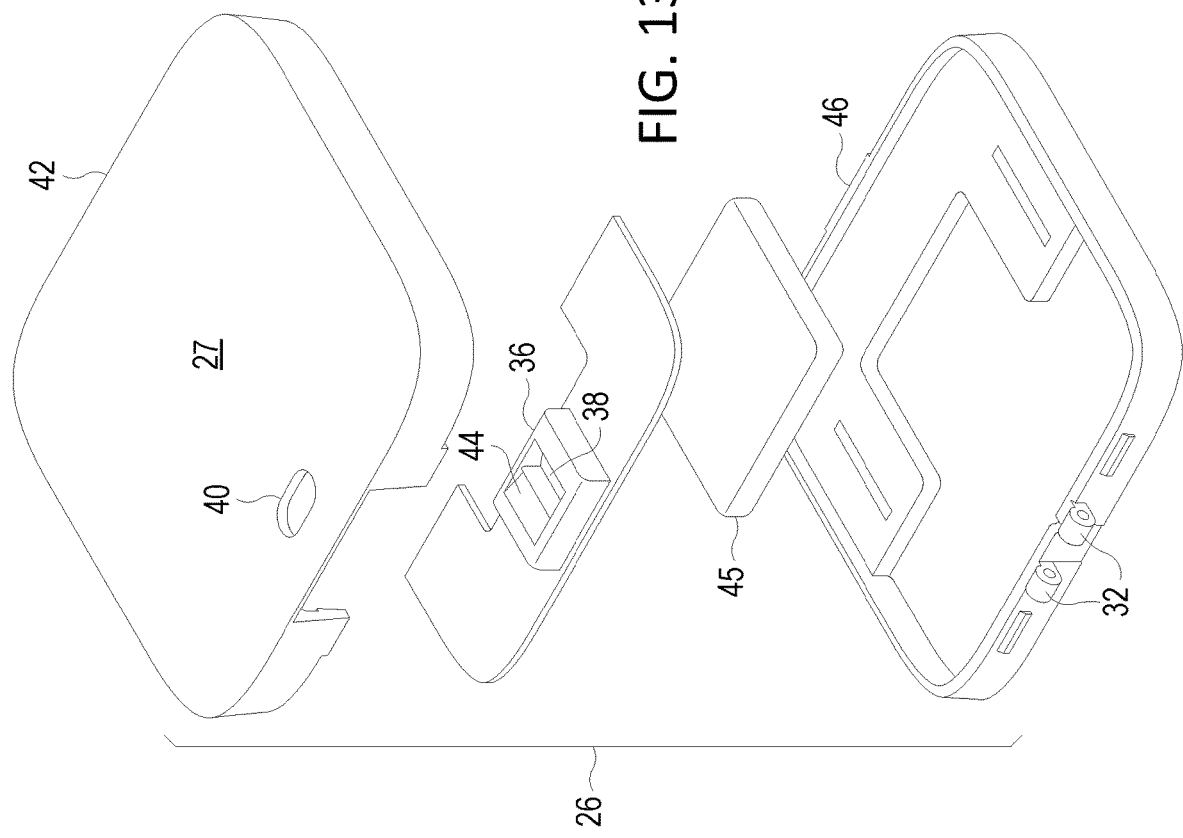
FIG. 13 shows an exploded view of a module of a foldable input device according to examples of the present disclosure.

With reference now to FIG. 13, in this example the module 26 comprises an optical module 36 that includes a light source 38 configured to emit light through an aperture 40 in a top case 42 of the module. The optical module 36 further includes an optical sensor 44 configured to receive light reflected from an underlying surface (see, e.g., surface 14 in FIG. 7). The module 26 also comprises a battery 45 sandwiched between the top case 42 and a bottom case 46.

As best seen in FIGS. 3, 5, and 6, when the input device 10 is in this flat configuration, the module 26 is depressed within the recess 24 of head portion 18 such that both the pivoting end 31 and opposing moveable end 33 of the module are within the input device. In this flat configuration, the module 26 is substantially flush with the other surfaces on the bottom side 48 of the input device. In other words, the exterior surface 27 of the top case 42 of module 26 is substantially flush with the lower exterior surfaces 29 of the tail segments 20 in foldable tail portion 16. In some examples, the substantially flush exterior surface 27 of the top case 42 of module 26 may be coplanar with or slight recessed compared to the lower exterior surfaces 29 of the tail segments 20. In this manner, the input device has a substantially uniform and flat configuration on both the bottom side 48 and top side 50. Accordingly, and in one potential advantage of the present disclosure, in this flat configuration the input device 10 is conveniently portable and may be easily slipped into and removed from a pocket of a carry case, item of clothing, or other confined space.

From this flat orientation, a user may fold the input device 10 into the curved orientation of FIGS. 2, 4 and 7 to create a comfortable and ergonomically suitable shape on which the user may rest her hand and operate the device, for example, as a mouse to control a displayed pointer. As described further below and in another potential advantage of the present disclosure, the input device 10 includes a linkage that is configured to cause the module to move from a recessed position to a protruding position beyond the recess 24 upon bending of the foldable tail portion 16 from the flat orientation to the curved orientation.

Figure 14:
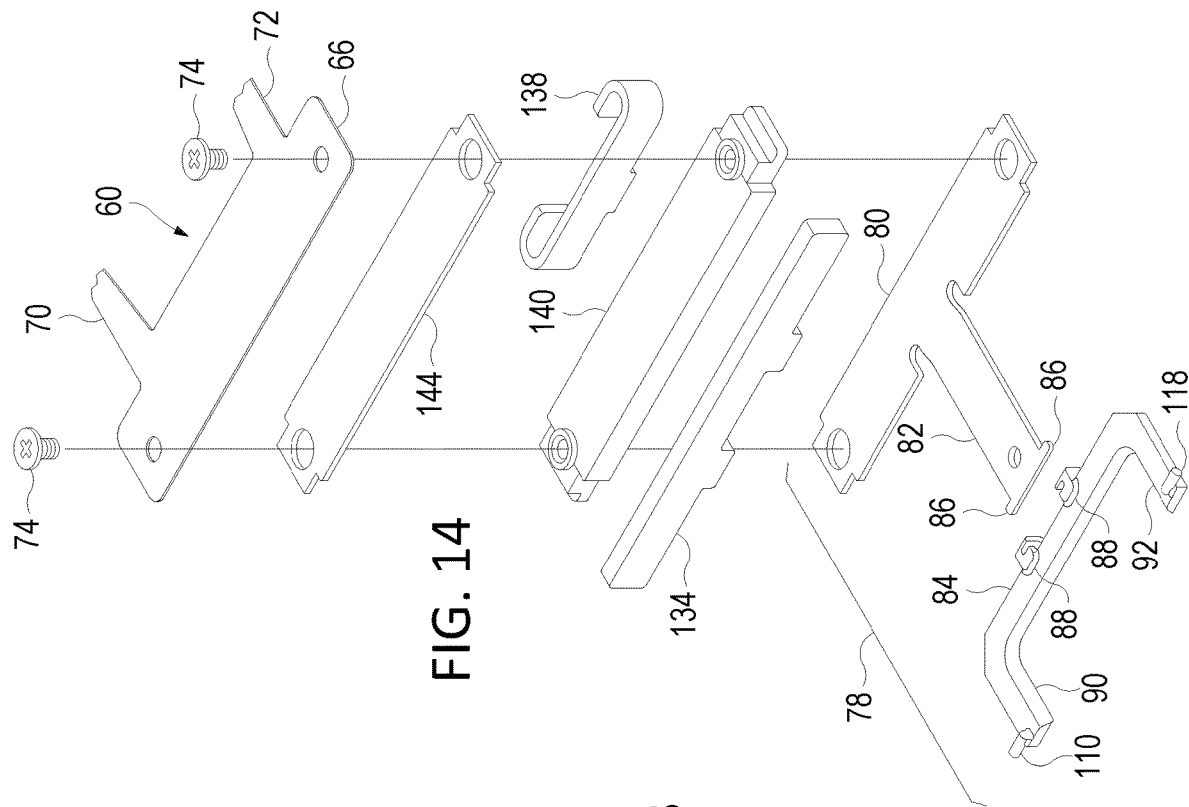
FIG. 14 shows an exploded view of the linkage of the foldable input device of FIGS. 1-10 according to examples of the present disclosure.

With reference now to FIGS. 9, 10 and 14, the input device 10 includes a slidable frame 60 that comprises an anchor portion 62 affixed to a rear end 64 of the foldable tail portion 16 and a connecting portion 66 opposite to the anchor portion. As described further below, the connecting portion 66 is configured to slide relative to the foldable tail portion 16 when the foldable tail portion is being folded. The slidable frame 60 includes a first elongated member 70 and opposing second elongated member 72 extending between the anchor portion 62 and the connecting portion 66. The first elongated member 70 and second elongated member 72 are slidably received under tabs 74 extending from each of the tail segments 20 (see also FIGS. 3 and 4).

In this example and with reference to FIG. 14, a linkage 78 comprises a slidable frame connector 80 affixed to the connecting portion 66 of the slidable frame 60 via fasteners 74. An extension member 82 extends from the slidable frame connector 80 and is rotatably coupled to a coupling member 84 via tabs 86 moveably received within slots in capturing members 88 on the coupling member. The coupling member 84 couples a first arm 90 to a second arm 92 spaced from the first arm. As described further below, the first arm 90 and second arm 92 are configured to engage and move the module 26 relative to the head portion 18 upon bending of the foldable tail portion 16 and corresponding movement of the slidable frame 60 and linkage 78.

With reference to FIG. 9, the linkage 78 also includes a slider member 96 that is affixed to the extension member 82 via fastener 98 and is slidably received in a travel guide slot 100 located in a planar surface 102 of the head portion 18 (see also FIGS. 1 and 2). As described further below, the slider member 96 guides and constrains the movement of the extension member 82 to be parallel to the planar surface 102.

With reference now to FIG. 10, the first arm 90 moves within a first groove 108 of the module 26 and comprises a first lateral protrusion 110 that is constrained to move within a first slot 112 located in a first sidewall 114 that defines the first groove. In a similar manner, the second arm 92 moves within a second groove 116 of the module 26 and comprises a second lateral protrusion 118 constrained to move within a second slot 120 located in a second sidewall 122 that defines the second groove. With reference also to FIGS. 6 and 8, each of the first slot 112 and second slot 120 is angled with respect to an upper surface 126 of the module 26. More particularly, each slot 112, 120 is angled upwardly from right to left in the x-axis direction, with the higher portion of each slot located between the front 130 of the head portion 18 and the lower portion of each slot.

Accordingly, starting with the input device 10 in the flat orientation of FIG. 6, bending the foldable tail portion 16 downwardly causes movement of the slidable frame 60 (and first elongated member 70 and second elongated member 72) in the x-axis direction relative to the head portion 18 and changes the input device from the flat orientation to the curved orientation of FIG. 8. As the connecting portion 66 of slidable frame 60 and attached slidable frame connector 80 advance toward the front 130 of head portion 18, the extension member 82 of linkage 78 pushes the first arm 90 and second arm 92 in the same direction, thereby advancing the first lateral protrusion 110 within the first slot 112 and the second lateral protrusion 118 within the second slot 120. The slider member 96 is constrained to slide linearly in travel guide slot 100, which similarly constrains movement of the extension member 82 to the x-axis direction and prevents the extension member from moving in the z-axis direction.

As shown in FIG. 8, this movement of the first arm 90 and second arm 92 in turn causes movement of the module 26 in a second, negative z-axis direction as it pivots downwardly about pin 34 and causes the moveable end 33 of the module 26 to protrude from the recess 24 in the head portion 18. Accordingly, and in another potential advantage of the present disclosure, by moving the module 26 in this manner the aperture 40 in top case 42 through which light is emitted and received by the optical module 36 is positioned at a larger angle (closer to normal) with respect to an underlying surface 14 as compared to the module 26 being fully retained within recess 24. Advantageously, providing this angle of incidence closer to normal for the emitted light produces greater reflections from the underlying surface, thereby increasing the fidelity and accuracy of location tracking by the optical module 36.

From the curved orientation in FIGS. 7 and 8, the user may return the input device 10 to the flat orientation by bending the foldable tail portion 16 in the opposite direction. As the slidable frame 60 moves away from the front 130 of head portion 18, the linkage 78 in turn cooperates with first slot 112 and second slot 120 to retract the module 26 and its moveable end 33 back into the recess 24.

To assist in maintaining the input device 10 in either the flat orientation or the curved orientation, the input device may utilize two or more magnets. In the present example and with reference to FIGS. 6, 9 and 14, the input device 10 includes a head portion magnet 134 affixed at a rear end 136 of the head portion 18 and a tail portion magnet 138 affixed to a center portion of the foldable tail portion 16. A moveable magnet 140 is affixed to the connecting portion 66 of the slidable frame 60 and located between the head portion magnet 134 and the tail portion magnet 138.

As shown in FIG. 6, when the input device 10 is in the flat orientation, the moveable magnet 140 is magnetically coupled to the tail portion magnet 138. Advantageously, this magnetic coupling prevents the slidable frame 60 and linkage 78 from moving towards the front 130 of head portion 18 to thereby maintain the input device 10 in the flat orientation. With reference to FIG. 8, when the user overcomes this magnetic coupling and folds the foldable tail portion 16 to transition the input device into the curved orientation, the moveable magnet 140 is attracted and magnetically coupled to the head portion magnet 134. In this manner, the slidable frame 60 and linkage 78 are prevented from moving away from the front 130 of head portion 18 to thereby maintain the input device 10 in the curved orientation.

In some examples and with reference to FIGS. 6 and 14, the input device 10 includes a magnetic shield 144 interposed between the moveable magnet 140 and the connecting portion 166. Additionally, the slidable frame connector 80 on the other side of moveable magnet 140 may be fabricated from a material that provides magnetic shielding properties. Any suitable magnetic shielding material may be utilized, with one example being a ferromagnetic metal alloy having a higher nickel content, such as 50% nickel or greater. Advantageously, providing such magnetic shields can direct the lines of flux from moveable magnet 140 to increase the magnet's field strength in the x-axis direction.

In other examples, input device 10 may utilize other configurations of a linkage to engage and move the module 26 relative to the head portion 18 upon movement of the slidable frame 60. With reference now to FIG. 11, in this example input device 10 includes linkage 200 that utilizes a single arm 204 extending into a single groove 208 within the module 26. The single arm is rotatably coupled to extension member 82 at a first end. At the opposite end a first lateral protrusion 212 is constrained to move within a first slot 214 located in a first sidewall 216 that defines the groove 208. Similarly, a second lateral protrusion 220 on the opposite side is constrained to move within a second slot 222 located in a second sidewall 224 opposite to the first sidewall 216 that defines the groove 208.

As with slots 112 and 120 in linkage 78 described above, the first slot 214 and the second slot 222 are angled with respect to the upper surface 126 of the module 26. More particularly, each slot 214, 222 is angled upwardly from right to left, with the higher portion of each slot located between the front 130 of the head portion 18 and the lower portion of each slot. Accordingly and as described above, movement of the slidable frame 60 in a first direction to change the input device 10 from the flat orientation to the curved orientation causes movement of the module 26 in a second direction and causes the moveable end 33 of the module to protrude from the recess 24 in the head portion 18.

With reference now to FIGS. 12, 15, and 16, in another example input device 10 includes linkage 300 that also utilizes a single arm extending into a single groove 304 within the module 26. In this example, the single arm is an extension of the extension member 82. A biasing element in the form of a spring 320 engages the module 26 at the rotatable coupling of the module to the head portion 18. In this configuration, the spring 320 biases the module toward the flat orientation in which the module is substantially flush within the recess 24.

The single groove 304 comprises a first ramped surface 308 and the single arm comprises a projection 310 configured to contact the first ramped surface 308 during movement of the input device between the flat orientation and the curved orientation, wherein the contact of the projection 310 on the first ramped surface 308 causes the module to protrude from the recess in the head portion.

The groove 304 also includes a second ramped surface 314 adjoining the first ramped surface 308 and forming an angle greater than 180 degrees with the first ramped surface 308. With reference to FIGS. 15 and 16, as the foldable tail portion 16 is bent and the input device transitions between the flat orientation and the curved orientation, the projection 310 rides against the first ramped surface 308 and moves the module 26 downwardly from the recess 24. As the projection 310 crests the first ramped surface 308 it continues on the second ramped surface 314, with the spring 320 biasing the module 26 upwardly to retain the module in a curved orientation. Advantageously, the angled second ramped surface 314 in cooperation with the spring 320 operates to retain the module 26 in this protruding posture when the input device 10 is in the curved orientation.

FIG. 17 depicts a flowchart illustrating a method 400 of folding an input device between a flat orientation and a curved orientation according to examples of the present disclosure. Method 400 may be implemented using the example configurations of input device 10 as described above and other configurations as contemplated by the present disclosure. The following description of method 400 is provided with reference to the components described herein and shown in FIGS. 1-16.

The following description of method 400 is provided by way of example and is not meant to be limiting. Therefore, it is to be understood that method 400 may include additional and/or alternative steps relative to those illustrated in FIG. 17. It will also be appreciated that method 400 also may be performed in other contexts using other suitable components.

In one example, the method 400 may be practiced using an input device 10 foldable between a flat orientation in which both ends of a module 26 comprising a sensor are within the input device and a curved orientation in which one of the ends of the module protrudes from the input device, the input device comprising a head portion 18 comprising a recess 24, the module positioned within the recess and rotatably coupled to the head portion, a foldable tail portion 16 coupled to the head portion, a slidable frame 60 comprising an anchor portion 62 affixed to the foldable tail portion and a connecting portion 66 configured to slide relative to the tail portion as the foldable tail portion is folded, and a linkage 78 affixed to the slidable frame and configured to engage and move the module relative to the head portion upon sliding of the slidable frame relative to the tail.

The method 400 comprises, at 404, bending the foldable tail portion 16 from the flat orientation to the curved orientation, thereby causing the linkage to move toward the head portion 18 and to thereby cause the module 26 to move from a recessed position within the recess to a protruding position beyond the recess.

The following paragraphs provide additional support for the claims of the subject application. One aspect provides an input device foldable between a flat orientation in which both ends of a module comprising a sensor are within the input device and a curved orientation in which one of the ends of the module protrudes from the input device, the input device comprising: a head portion comprising a recess, the module coupled to the head portion within the recess; a foldable tail portion coupled to the head portion; a slidable frame comprising an anchor portion affixed to the foldable tail portion and a connecting portion configured to slide relative to the tail portion as the foldable tail portion is folded; and a linkage affixed to the slidable frame and configured to engage and move the module relative to the head portion upon sliding of the slidable frame relative to the tail. The input device may additionally or alternatively include, wherein the module is rotatably coupled to the head portion; the anchor portion is affixed to a rear end of the foldable tail portion, and the connecting portion is opposite to the anchor portion; the linkage further comprises a slidable frame connector that is affixed to the connecting portion of the sliding frame; and the linkage further comprises at least one arm that is configured to engage and move the module relative to the head portion upon sliding of the slidable frame relative to the tail.

The input device may additionally or alternatively include, wherein the at least one arm is positioned in a groove within the module. The input device may additionally or alternatively include, wherein the at least one arm comprises at least one lateral protrusion constrained to move within a slot located in a sidewall that defines the groove. The input device may additionally or alternatively include, wherein the slot is angled with respect to an upper surface of the module, wherein movement of the slidable frame in a first direction to change the input device from the flat orientation to the curved orientation causes movement of the module in a second direction and causes the module to protrude from the recess in the head portion. The input device may additionally or alternatively include, a head portion magnet; a tail portion magnet; and a moveable magnet affixed to the connecting portion of the slidable frame and located between the head portion magnet and the tail portion magnet, wherein the moveable magnet is magnetically coupled to the tail portion magnet when the input device is in the flat orientation, and the moveable magnet is magnetically coupled to the head portion magnet when the input device is in the curved orientation.

The input device may additionally or alternatively include, wherein the at least one arm is a first arm and a second arm that are engaging the module, wherein the first arm is spaced from the second arm and is coupled to the second arm by a coupling member, the first arm and the second arm configured to move the module relative to the head portion upon movement of the slidable frame. The input device may additionally or alternatively include, wherein the coupling member is rotatably coupled to an extension member that extends from the slidable frame connector. The input device may additionally or alternatively include, the linkage further comprising a slider member affixed to the extension member and slidably received in a travel guide slot located in a planar surface of the head portion. The input device may additionally or alternatively include, wherein the first arm moves within a first groove of the module and comprises a first lateral protrusion constrained to move within a first slot located in a first sidewall that defines the first groove, and the second arm moves within a second groove of the module and comprises a second lateral protrusion constrained to move within a second slot located in a second sidewall that defines the second groove.

The input device may additionally or alternatively include, wherein the at least one arm is a single arm that is positioned in a groove within the module. The input device may additionally or alternatively include, wherein the single arm comprises a first lateral protrusion constrained to move within a first slot located in a first sidewall that defines the groove, and a second lateral protrusion constrained to move within a second slot located in a second sidewall opposite to the first sidewall that defines the groove. The input device may additionally or alternatively include, wherein the first slot and the second slot are angled with respect to an upper surface of the module, wherein movement of the slidable frame in a first direction to change the input device from the flat orientation to the curved orientation causes movement of the module in a second direction and causes the module to protrude from the recess in the head portion. The input device may additionally or alternatively include, wherein the groove comprises a ramped surface and the single arm comprises a projection configured to contact the ramped surface during movement of the input device between the flat orientation and the curved orientation, wherein the contact of the projection on the ramped surface causes the module to protrude from the recess in the head portion. The input device may additionally or alternatively include, wherein the ramped surface is a first ramped surface, the groove further comprising a second ramped surface adjoining the first ramped surface and forming an angle greater than 180 degrees with the first ramped surface. The input device may additionally or alternatively include a biasing element engaging the module at the rotatable coupling of the module to the head portion, the biasing element biasing the module toward the flat orientation in which the module is substantially flush within the recess.

Another aspect provides a method of folding an input device between a flat orientation in which both ends of a module comprising a sensor are within the input device and a curved orientation in which one of the ends of the module protrudes from the input device, the input device comprising a head portion comprising a recess, the module coupled to the head portion within the recess, a foldable tail portion coupled to the head portion, a slidable frame comprising an anchor portion affixed to the foldable tail portion and a connecting portion configured to slide relative to the tail portion as the foldable tail portion is folded, and a linkage affixed to the slidable frame and configured to engage and move the module relative to the head portion upon sliding of the slidable frame relative to the tail, the method comprising bending the foldable tail portion from the flat orientation to the curved orientation, thereby causing the linkage to move toward the head portion and to thereby cause the module to move from a recessed position within the recess to a protruding position beyond the recess. The method may additionally or alternatively include, wherein: the module is rotatably coupled to the head portion; the anchor portion is affixed to a rear end of the foldable tail portion, and the connecting portion is opposite to the anchor portion; the linkage further comprises a slidable frame connector that is affixed to the connecting portion of the sliding frame; and the linkage further comprises at least one arm that is configured to engage and move the module relative to the head portion upon sliding of the slidable frame relative to the tail. The method may additionally or alternatively include, wherein the at least one arm is positioned in a groove within the module. The method may additionally or alternatively include, wherein the at least one arm comprises at least one lateral protrusion constrained to move within a slot located in a sidewall that defines the groove.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

What is claimed is:

1. An input device foldable between a flat orientation in which both ends of a module comprising a sensor are within the input device and a curved orientation in which one of the ends of the module protrudes from the input device, the input device comprising:
   a head portion comprising a recess, the module comprising a pivoting end rotatably coupled about a hinge at a distal end of the head portion within the recess;
   a foldable tail portion coupled to the head portion;
   a slidable frame comprising an anchor portion affixed to the foldable tail portion and a connecting portion configured to slide relative to the tail portion as the foldable tail portion is folded; and
   a linkage affixed to the slidable frame and configured to engage and move the module to cause the module to rotate about the hinge upon sliding of the slidable frame relative to the tail portion.

2. The input device of claim 1, wherein:
   the anchor portion is affixed to a rear end of the foldable tail portion, and the connecting portion is opposite to the anchor portion;
   the linkage further comprises a slidable frame connector that is affixed to the connecting portion of the slidable frame; and
   the linkage further comprises at least one arm that is configured to engage and move the module relative to the head portion upon sliding of the slidable frame relative to the tail portion.

3. The input device of claim 2, wherein the at least one arm is positioned in a groove within the module.

4. The input device of claim 3, wherein the at least one arm comprises at least one lateral protrusion constrained to move within a slot located in a sidewall that defines the groove.

5. The input device of claim 4, wherein the slot is angled with respect to an upper surface of the module, wherein movement of the slidable frame in a first direction to change the input device from the flat orientation to the curved orientation causes movement of the module in a second direction and causes the module to protrude from the recess in the head portion.

6. The input device of claim 2, wherein the at least one arm is a first arm and a second arm that are engaging the module, wherein the first arm is spaced from the second arm and is coupled to the second arm by a coupling member, the first arm and the second arm configured to move the module relative to the head portion upon movement of the slidable frame.

7. The input device of claim 6, wherein the coupling member is rotatably coupled to an extension member that extends from the slidable frame connector.

8. The input device of claim 7, the linkage further comprising a slider member affixed to the extension member and slidably received in a travel guide slot located in a planar surface of the head portion.

9. The input device of claim 6, wherein the first arm moves within a first groove of the module and comprises a first lateral protrusion constrained to move within a first slot located in a first sidewall that defines the first groove, and the second arm moves within a second groove of the module and comprises a second lateral protrusion constrained to move within a second slot located in a second sidewall that defines the second groove.

10. The input device of claim 2, wherein the at least one arm is a single arm that is positioned in a groove within the module.

11. The input device of claim 10, wherein the single arm comprises a first lateral protrusion constrained to move within a first slot located in a first sidewall that defines the groove, and a second lateral protrusion constrained to move within a second slot located in a second sidewall opposite to the first sidewall that defines the groove.

12. The input device of claim 11, wherein the first slot and the second slot are angled with respect to an upper surface of the module, wherein movement of the slidable frame in a first direction to change the input device from the flat orientation to the curved orientation causes movement of the module in a second direction and causes the module to protrude from the recess in the head portion.

13. The input device of claim 10, wherein the groove comprises a ramped surface and the single arm comprises a projection configured to contact the ramped surface during movement of the input device between the flat orientation and the curved orientation, wherein the contact of the projection on the ramped surface causes the module to protrude from the recess in the head portion.

14. The input device of claim 13, wherein the ramped surface is a first ramped surface, the groove further comprising a second ramped surface adjoining the first ramped surface and forming an angle greater than 180 degrees with the first ramped surface.

15. The input device of claim 10, further comprising a biasing element engaging the module at the rotatable coupling of the module to the head portion, the biasing element biasing the module toward the flat orientation in which the module is substantially flush within the recess.

16. The input device of claim 1, further comprising:
a head portion magnet;
a tail portion magnet; and
a moveable magnet affixed to the connecting portion of the slidable frame and located between the head portion magnet and the tail portion magnet, wherein the moveable magnet is magnetically coupled to the tail portion magnet when the input device is in the flat orientation, and the moveable magnet is magnetically coupled to the head portion magnet when the input device is in the curved orientation.

17. A method of folding an input device between a flat orientation in which both ends of a module comprising a sensor are within the input device and a curved orientation in which one of the ends of the module protrudes from the input device, the input device comprising a head portion comprising a recess, the module comprising a pivoting end rotatably coupled about a hinge at a distal end of the head portion within the recess, a foldable tail portion coupled to the head portion, a slidable frame comprising an anchor portion affixed to the foldable tail portion and a connecting portion configured to slide relative to the tail portion as the foldable tail portion is folded, and a linkage affixed to the slidable frame and configured to engage and move the module to cause the module to rotate about the hinge upon sliding of the slidable frame relative to the tail portion, the method comprising:
bending the foldable tail portion from the flat orientation to the curved orientation, thereby causing the linkage to move toward the head portion and to thereby cause the module to rotate about the hinge and to move from a recessed position within the recess to a protruding position beyond the recess.

18. The method of claim 17, wherein:
the module is rotatably coupled to the head portion;
the anchor portion is affixed to a rear end of the foldable tail portion, and the connecting portion is opposite to the anchor portion;
the linkage further comprises a slidable frame connector that is affixed to the connecting portion of the slidable frame; and
the linkage further comprises at least one arm that is configured to engage and move the module relative to the head portion upon sliding of the slidable frame relative to the tail portion.

19. The method of claim 18, wherein the at least one arm is positioned in a groove within the module.

20. An input device foldable between a flat orientation in which both ends of a module comprising a sensor are substantially flush with the input device and a curved orientation in which one of the ends of the module protrudes from the input device, the input device comprising:
a head portion comprising a recess, the module comprising a pivoting end rotatably coupled about a hinge at a distal end of the head portion within the recess;
a foldable tail portion coupled to the head portion;
a slidable frame comprising an anchor portion affixed to the foldable tail portion and a connecting portion configured to slide relative to the tail portion as the foldable tail portion is folded; and
a linkage coupled to the slidable frame, the linkage comprising:
a first arm positioned in a first groove within the module, the first arm comprising a first lateral protrusion constrained to move within a first slot located in a first sidewall that defines the first groove; and
a second arm positioned in a second groove within the module, the second arm spaced from the first arm and coupled to the first arm by a coupling member, the second arm comprising a second lateral protrusion constrained to move within a second slot located in a second sidewall that defines the second groove, wherein the first arm and the second arm are configured to rotate the module about the hinge upon movement of the slidable frame.

* * * * *